(12) United States Patent
Cesare

(10) Patent No.: US 6,848,355 B2
(45) Date of Patent: Feb. 1, 2005

(54) HANDLE FOR COOKING UTENSILS INCLUDING A TEMPERATURE INDICATOR DEVICE

(75) Inventor: Pacenti Giulio Cesare, Firenze (IT)

(73) Assignee: TVS S.p.A., Urbino (IT)

( * ) Notice: Subject to any disclaimer, the term of this patent is extended or adjusted under 35 U.S.C. 154(b) by 0 days.

(21) Appl. No.: 10/482,868

(22) PCT Filed: Dec. 19, 2002

(86) PCT No.: PCT/IT02/00806

§ 371 (c)(1),
(2), (4) Date: Jan. 6, 2004

(87) PCT Pub. No.: WO03/051165

PCT Pub. Date: Jun. 26, 2003

(65) Prior Publication Data

US 2004/0163548 A1 Aug. 26, 2004

(30) Foreign Application Priority Data

Dec. 19, 2001 (IT) .................................. PO2001A0009

(51) Int. Cl.⁷ ............................ A23L 1/00; A47J 37/00;
A47J 43/00; G01K 1/02; G01K 1/14
(52) U.S. Cl. ............................ 99/342; 99/403; 99/422;
16/110.1; 16/425; 374/141; 374/180
(58) Field of Search .................. 99/339, 340, 403–410,
99/422–425; 16/422, 425, 111.1, 428, 382,
110.1; 220/758, 759, 744, 763, 776, 735,
573.4; 294/49–51, 57, 59, 55.5, 907; 126/373.1,
369; 374/141, 142, 147, 179, 180, 149,
155, 203, 158

(56) References Cited

U.S. PATENT DOCUMENTS

| 5,373,608 | A | * | 12/1994 | Welch | 16/425 |
| 5,704,092 | A | * | 1/1998 | Nicollet et al. | 16/425 |
| 6,298,775 | B1 | * | 10/2001 | Chen | 99/422 |
| 6,393,973 | B1 | * | 5/2002 | Velo et al. | 99/422 |
| 6,644,702 | B2 | * | 11/2003 | Liou | 294/57 |
| 6,694,868 | B1 | * | 2/2004 | Hung | 99/403 |

FOREIGN PATENT DOCUMENTS

| DE | 80 00 212 | 5/1980 |
| FR | 2014169 | 4/1970 |
| FR | 2521847 | 8/1983 |
| GB | 1110480 | 4/1968 |
| WO | 99/59455 | 11/1999 |

* cited by examiner

Primary Examiner—Timothy F. Simone
(74) Attorney, Agent, or Firm—Young & Thompson

(57) ABSTRACT

A handle (20) for cooking utensils, particularly pots or pans, of the type designed to be joined to the edge of the utensil (10), is made of a material, with low heat conductivity and equipped with an elongated plate (30) made of a material with high heat conductivity, having one terminal section in thermal contact with the body of the utensil (10) and the other end far from it, and with thermo-chromatic means (40) applied on the plate (30) and preferably consisting of crystals having (42a–42f) the ability to change color within predetermined ranges of temperature, so as to display information, related to the temperature of the bottom of the utensil, in different areas of the plate (30)

16 Claims, 5 Drawing Sheets

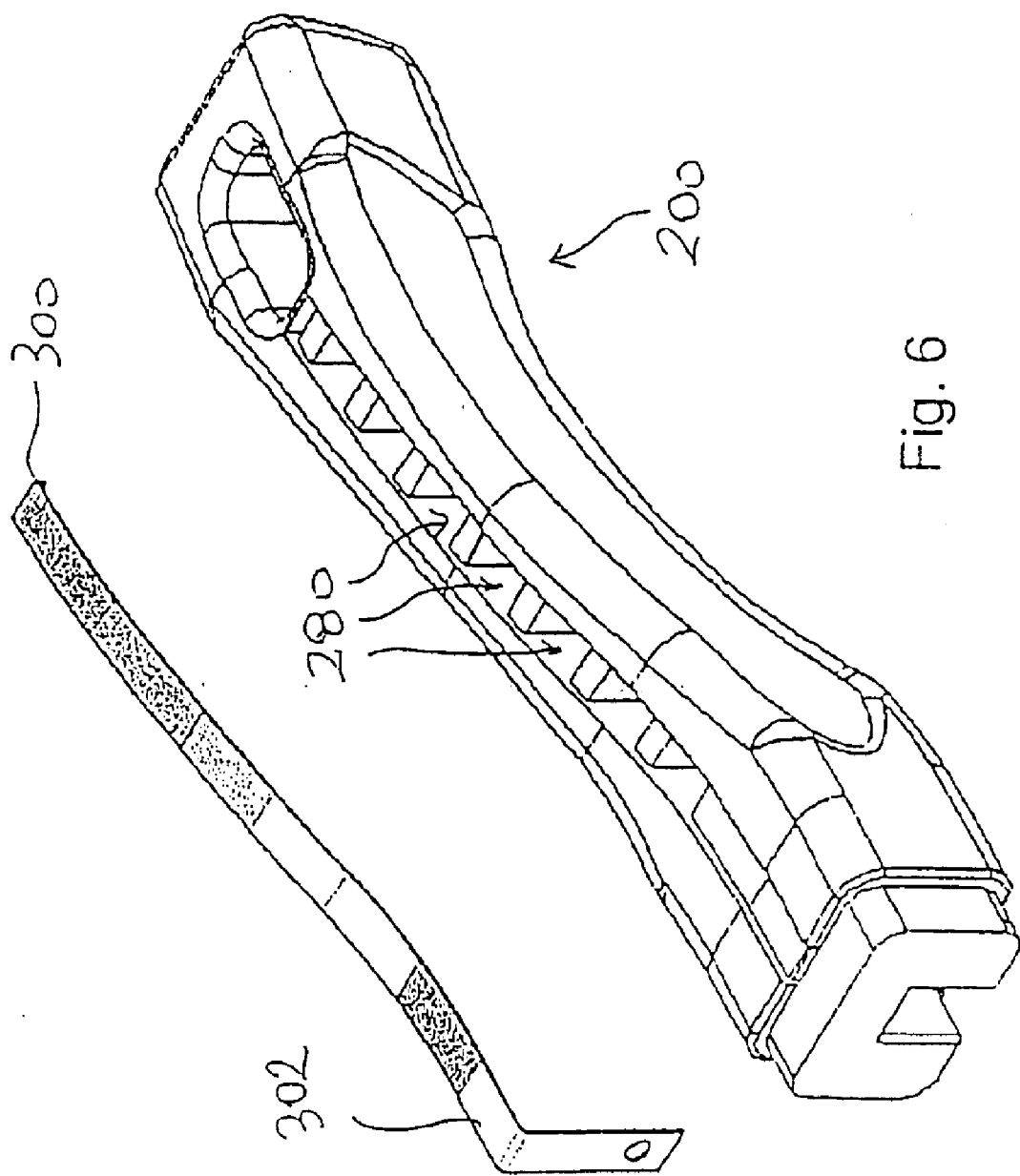

HANDLE FOR COOKING UTENSILS INCLUDING A TEMPERATURE INDICATOR DEVICE

CROSS REFERENCE TO RELATED APPLICATION

This is the 35 USC 371 national stage of International Application PCT/IT02/00806 filed on 19 Dec. 2002, which designated the United States of America.

FIELD OF THE INVENTION

This invention concerns a handle for cooking utensils equipped with a device for indicating the temperature of the utensil.

In particular, the invention relates to pots and pans, where it is evidently useful to solve the problem of determining the temperature when they are placed on a heat source, in order to control the progress of the cooking process.

BACKGROUND OF THE INVENTION

Various solutions to the aforementioned problem have been proposed to date. For example, U.S. Pat. No. 5,441,344 illustrates a pan on which the measurement and display of the temperature is obtained by a sensor, e.g. a thermocouple, in direct thermal contact with the cooking surface or by means of a clip applied to the side wall of the pan. An electronic circuit, connected to the sensor, measures and displays the temperature on a display located in the handle or on the clip.

Similarly, EP 0950368 illustrates a pan containing a temperature sensor consisting of a resistant track applied on a layer of insulating material that covers part of the surface of the pan. The resistant track has a variable temperature coefficient with the ends connected to a circuit for the measurement of the resistance or variation of the resistance, which it converts into the temperature value.

Further, EP 0931495 illustrates a pan having a temperature probe inserted in the bottom and connected to an electronic circuit for the measurement and display of the temperature. The probe and the conductors connected to the electronic circuit extend between the section making up the bottom of the pan and a perforated plaque fastened by cold molding technology to this section.

EP 0931496 illustrates a different solution consisting of a pan equipped with an infrared sensor located on the handle and connected to an electronic circuit for the transformation of the infrared rays into an electrical signal.

The solutions listed above are complex and expensive to apply, requiring alterations in the structure of the cooking utensil and/or the use of electronic circuits.

A device that makes no use of electronic circuits is illustrated in EP 0901005. The device is designed to indicate the temperature of vessels containing a food product to be heated and comprises a mixture of liquid crystals that change color between 35° C. and 45° C., causing a single message to appear in letters on a background having the same color of the mixture prior to changing color.

The device illustrated in EP 0901005 is useful for vessels, such as infants' nursing bottles, which need only to be heated slightly (35–45° C.) and where only a single message has to be displayed within a determined limited temperature range, while it is unsuitable for cooking utensils designed to operate at much higher temperatures (100–265° C.) and where more information and a broader temperature range are desirable.

A handle for cooking utensils according to the preamble of claim 1 is known from FR 2,521,867. This document discloses a handle for cooking utensils make of a material with low heat conductivity and comprising an plate in a material with a high thermal conductivity with one end in thermal contact with the body of the utensil and the other end at a distance from it, and thermo chromatic means applied on the plate; these latter having the ability to change color within specific ranges of temperature so as to display information, related to the temperature of the bottom of the utensil, in different areas of the plate.

SUMMARY OF THE INVENTION

The object of this invention is to provide a handle for cooking utensils equipped with a device capable of indicating the temperature of the utensil that overcomes the drawbacks of the known solutions.

In particular, the object of the invention is to provide a handle for cooking utensils, in particular pots and pans, equipped with a device capable of indicating the temperature of the utensil, integrated in the handle and that makes no use of electronic circuits.

It is also an object of the invention to provide a handle for cooking, utensils equipped with a device that displays various information relative to the changes of temperature of the utensil through the entire range of values during normal use.

A further object of the invention is to provide a cooking utensil equipped with a device capable of indicating the temperature that is fully integrated in the handle.

According to the present invention, these and other objects are achieved by a handle for cooking utensils having the features in the characterized part of claim 1.

These and other objects are achieved by a handle for cooking utensils made of a material with low heat conductivity and comprising a plate in a material with a high thermal conductivity with one end in thermal contact with the body of the utensil and the other end at a distance from it, and thermo-chromatic means applied on the plate. These latter are preferably crystals having the ability to change color within specific ranges of temperature so as to display information, related to the temperature of the bottom of the utensil, in different areas of the plate.

In a first preferred embodiment of the invention, the thermo-chromatic crystals are first applied to a film of transparent plastic material, such as polyester, which is then fastened to an elongated plate.

In a second embodiment, the crystals are applied, in the form of paint, in one or more layers, directly on an elongated plate.

In both cases, as will be illustrated more in detail hereafter, the changes in temperature along the elongated plate cause the crystals in contact with different areas of the plate to change color and thus to display information related to the change in time of the temperature of the bottom of the utensil and, thus, of the progress of cooking.

This information consists preferably of different colors or graphic or alphanumerical symbols which have been marked previously on the plastic film or elongated plate.

A handle according to the invention has the advantage of providing an economical means for measuring and controlling the temperature of the bottom of a pot or pan while it is heating or cooling.

Also, once the conductive plate has been calibrated, the same handle can be used for a wide range of pots or pans.

These and other advantages, as well as the technical features of this invention, will be clarified in the detailed description that follows of two non-limiting examples of its implementation.

BRIEF DESCRIPTION OF THE DRAWINGS

In the drawings:

FIG. 6 illustrates a detailed perspective view of the handle shown in FIG. 5 with the conducting plate removed.

DETAILED DESCRIPTION OF THE INVENTION

Figure 1:
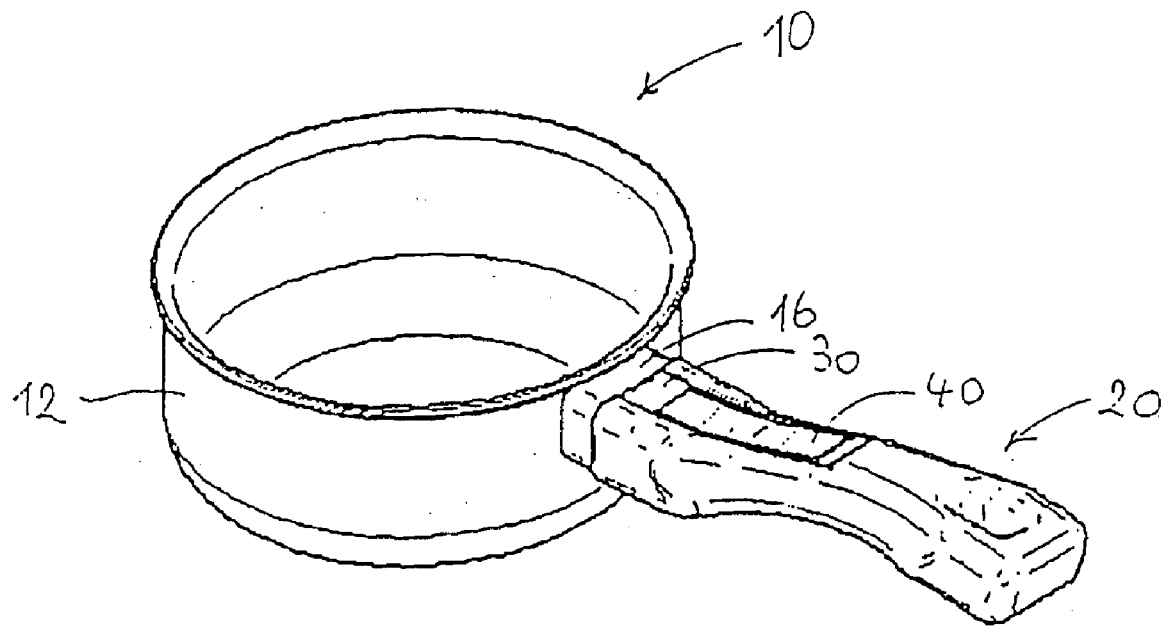
FIG. 1 illustrates a schematic view in perspective of a pan equipped with a handle in conformity with the invention, according to a first embodiment.
Figure 2:
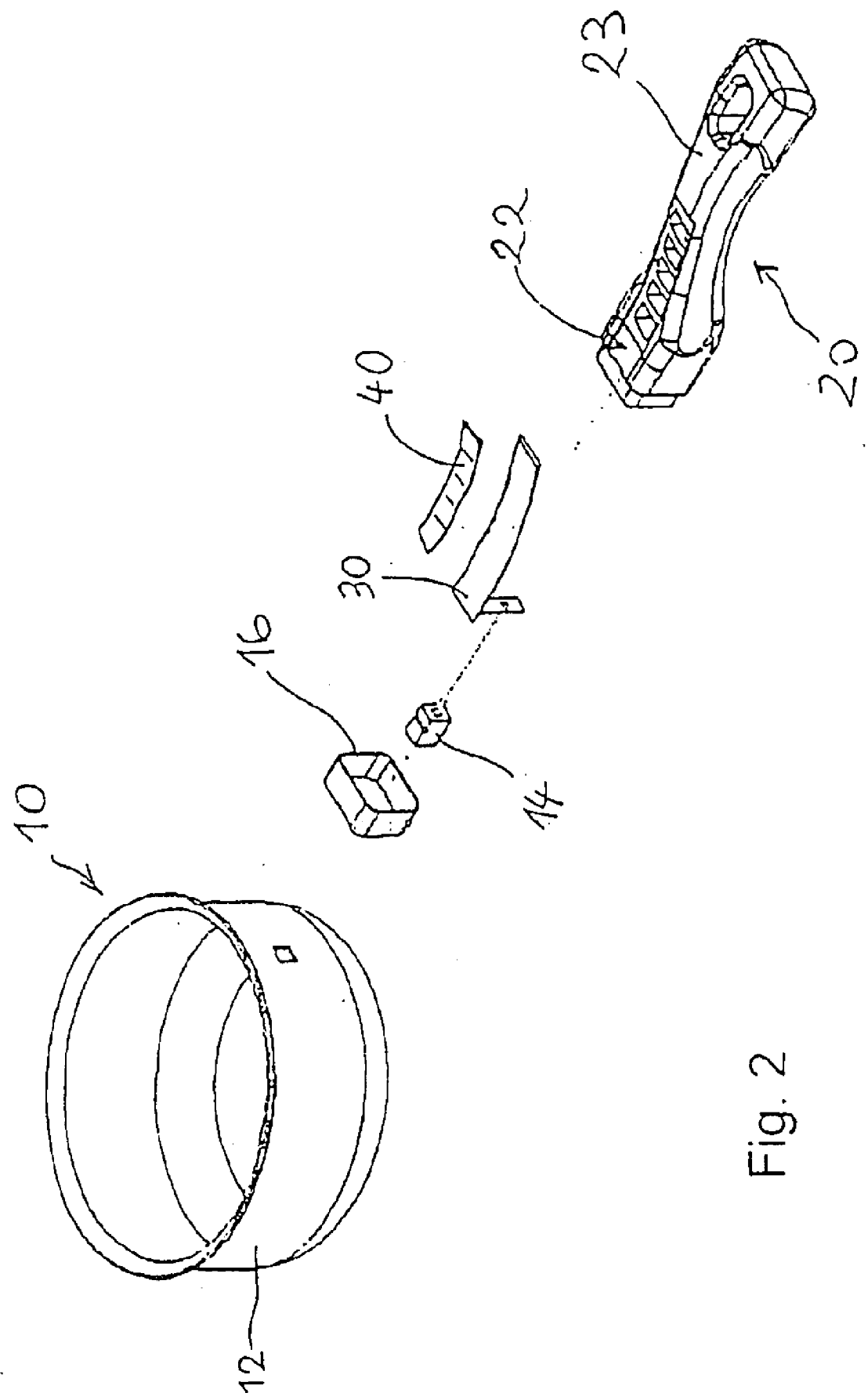
FIG. 2 shows an exploded view of the pan shown in FIG. 1.

With reference to FIG. 1 and FIG. 2, an ordinary aluminum pan 10 is fitted with a handle 20 in a material with low heat conductivity, such as bakelite, applied to the side 12 of the pan. In the example, the handle 20 is fastened by a screw 15 to a block 14 that is threaded on the inside, made of aluminum, welded to the outer face of the side 12 of the pan. A ring 16 in aluminum is provided to protect the handle 20 from the flame at the end adjacent to the pan 10.

Figure 3:
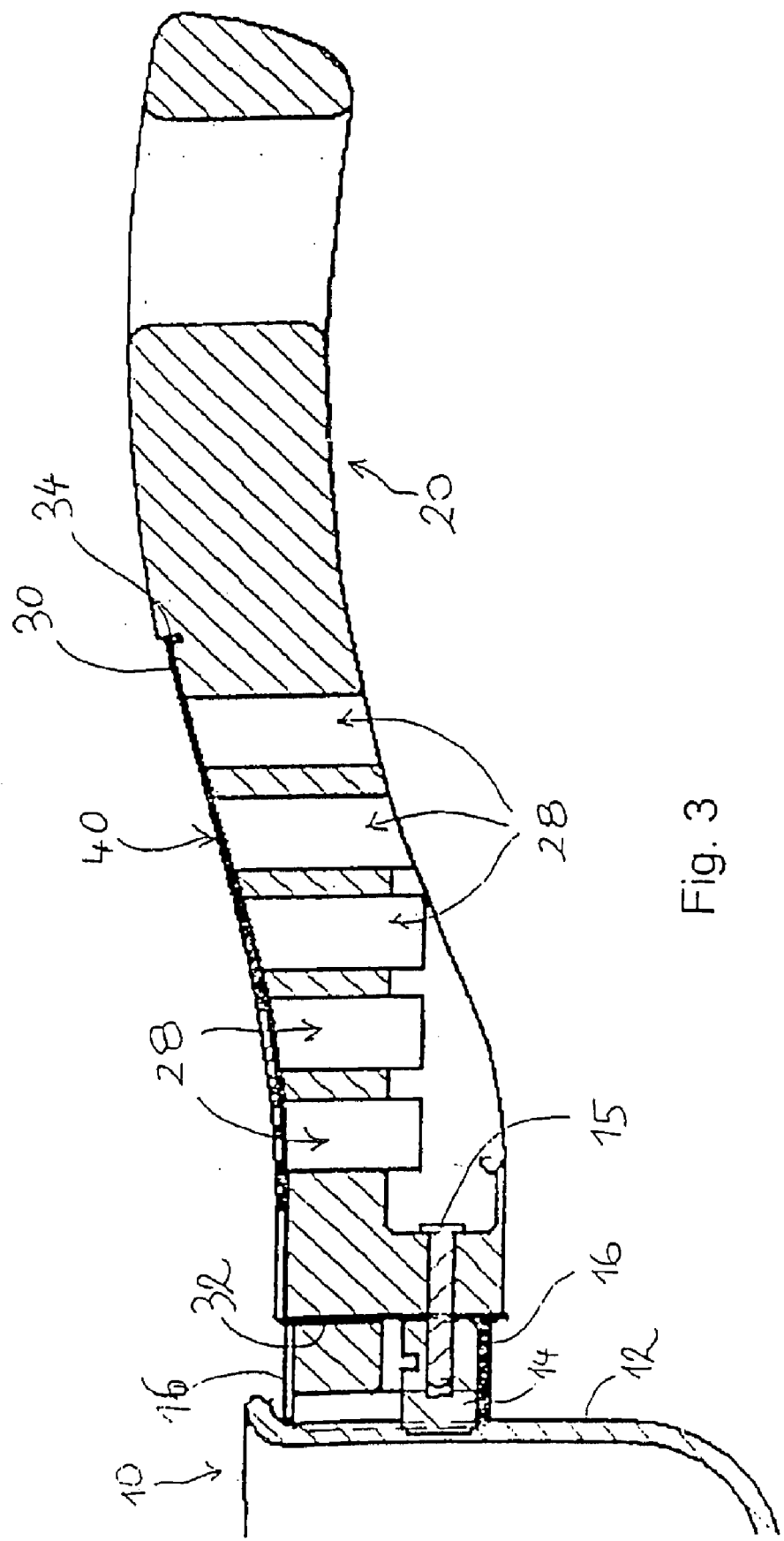
FIG. 3 illustrates a longitudinal cross section view of the handle shown in FIG. 1 and FIG. 2.

According to the invention (see also FIG. 3 and FIG. 4) an elongated plate 30 in a material with good heat conductivity, such as aluminum, is fitted into a housing 22 provided on the upper surface 23 of the handle 20 with a terminal section 32 in thermal contact with the side wall 12 of the pan 10 and the other end 34 at a distance from it. Advantageously, the terminal section 32 of the plate 30 passes through a hole 24, that connects the upper surface 23 with the front side 26 of the handle 20, and is held in place, between the block 14 and the handle 20, by the fastening screw 15 of the handle, that passes through a hole 36 provided in this terminal section 32.

By effect of heat conduction between the body of the pan 10—subject to the heat source—and plate 30 in thermal contact with it, for a given temperature of the bottom of the pan 10 in the plate there is a distribution of the temperature that decreases toward the end 34 furthest from the pan. Also, the changes in the temperature of the bottom of the pan 10 are reproduced in reduced scale along every point of the plate.

By accurate selection of the material and size of the plate, it is possible to ensure that the temperature in the plate ranges from 30° C. to 90° C., when the pan is subject to a heat source that brings the temperature of the bottom to values ranging from approx. 100° C. to 265° C.

It is also possible, once the plate has been calibrated, to use it as a thermometer of the bottom of the pan 10. For this purpose, on the part 38 of the plate laid flat along the upper surface of the handle 20, a plastic film 40 in polyester, having heat-sensitive liquid crystals 42a–42f preferably microencapsulated deposited on its surface, is applied.

Advantageously, a plurality of crystals, or mixtures of them, is deposited on the plastic film 40, which are activated at temperatures ranging from 20° C. to 100° C. Preferably, the distribution of the crystals 42a–42f along the plastic film, and thus along the plate 30, is arranged so that as the distance from the pan increases, so does the temperature at which the crystals are activated.

Figure 4:
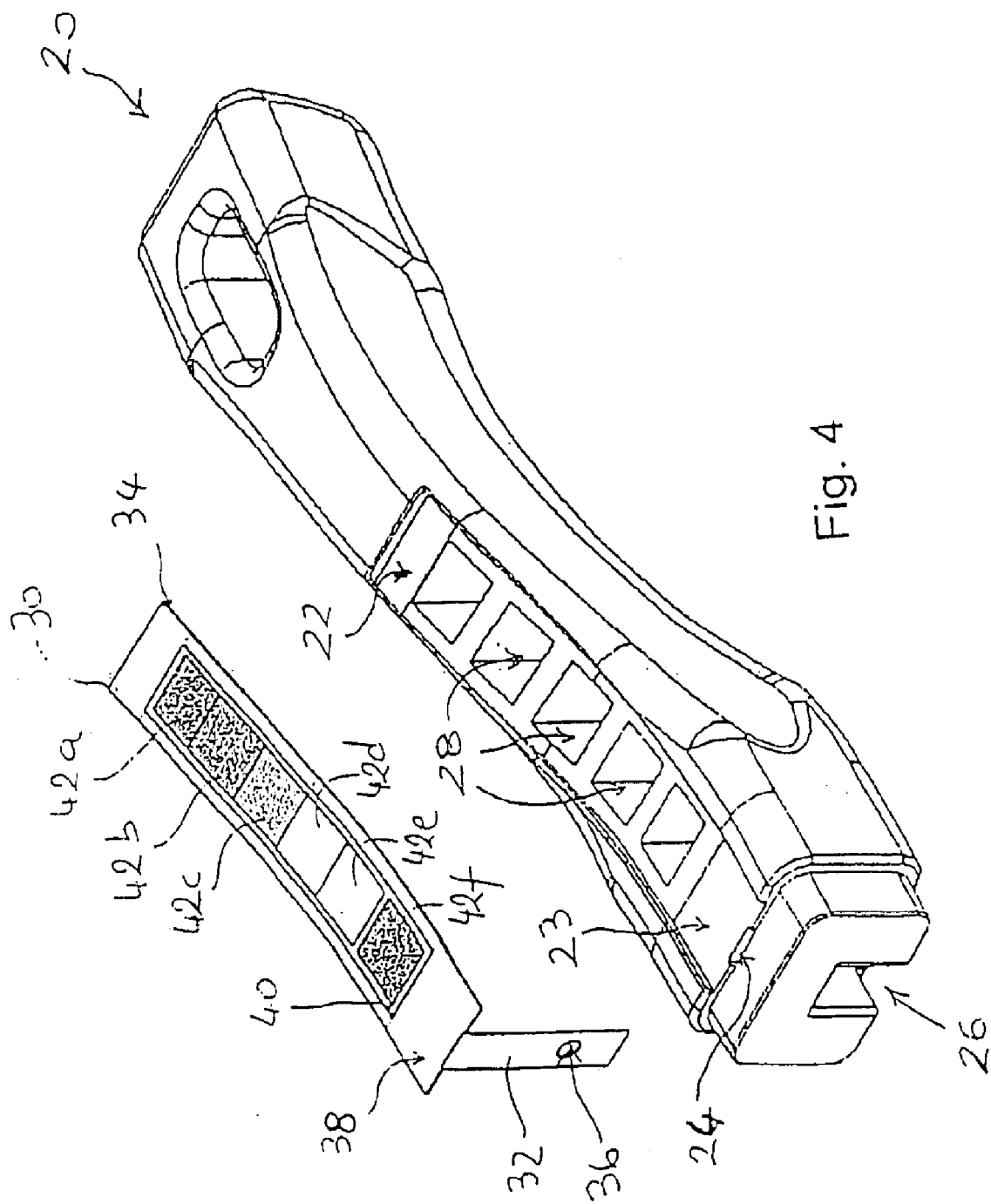
FIG. 4 illustrates a detailed view in perspective of the handle shown in FIG. 3 with the conducting plate removed.

Thus, while the pan is heating, the first crystals to be activated are the ones (42f,42e) located on the part of the plate 30 closest to the edge of the pan 10; later, as the temperature of the bottom of the pan increases, and consequently—although to a lesser extent—that of the plate, crystals 42d,42c located, in the example shown in FIG. 4, on the middle section of the plate, are activated; finally, when the temperature of the bottom of the pan reaches high values, crystals 42b,42a farthest from the body of the pan 10 are activated. The sequence of energizing of the crystals is obviously reversed during cooling.

Since thermo-chromatic liquid crystals and mixtures of them are currently available on the market, in particular manufactured with the technique of micro encapsulation, sensitive to temperatures up to 100° C., it is possible to select the crystals 42a–42f, to deposit on the film of polyester 40, in such a way that the change of color of the crystals will provide direct information about the progress of the temperature on the bottom of the pan. In particular, by calibrating and graduating the plate 30, it is possible to use crystals 42a–42f to display the temperature of the bottom of the pan 10 in numbers. Or, more simply, the change of color of the different crystals 42a–42f can be used to signal when the pan reaches the proper cooking temperature or a critical situation of overheating. Also, information can be displayed in the form of graphic or alphanumerical symbols previously reproduced on the film 40.

A layer of transparent polyurethane resin (not shown) can be provided to protect the plate 30 and the plastic film 40.

Figure 5:
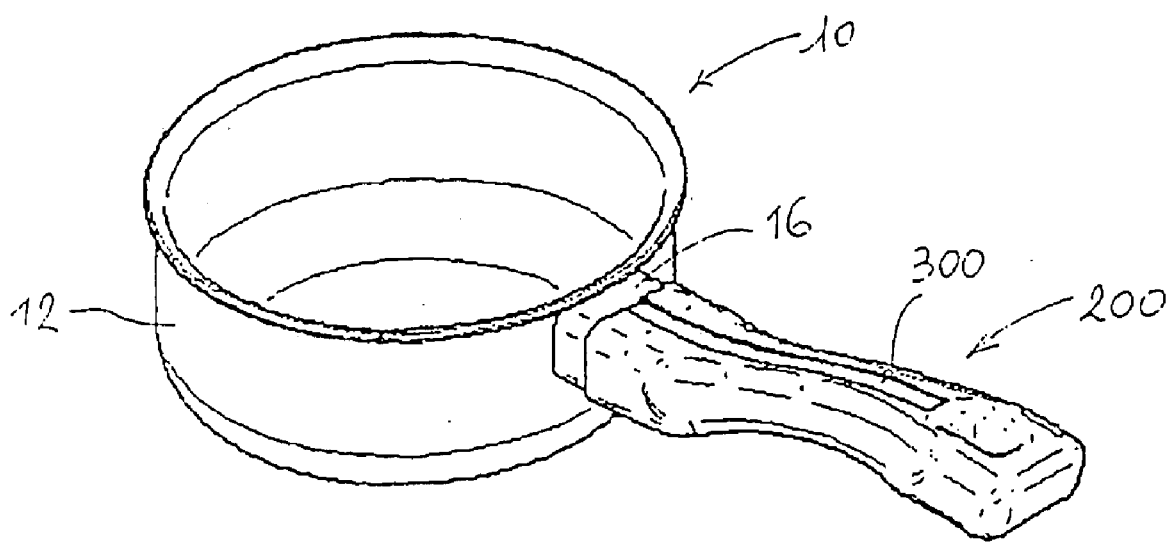
FIG. 5 illustrates a schematic view in perspective of a pan equipped with a handle in conformity with the invention, according to a second embodiment.

FIGS. 5 and 6 illustrate another handle 200, in conformity with the invention, equipped with a plate 300 in aluminum, narrower and longer than the plate 30 used in the previous example, but basically in the same way integrated into the handle 200 and in thermal contact with the body of the pan 10.

In this second case the upper face 302 of the plate is covered with one or more coats of paint containing thermochromatic crystals. Preferably the crystals are of the type that shows a particular color outside the range of activating temperature and become transparent within it.

For every type of paint used, due to the spatial and temporal variation of the temperature within the plate 300, as the temperature of the bottom of the pan 10 increases, areas of the plate farther and farther away from the body of the pan will reach the temperature at which the crystals are activated, turning the paint transparent in those areas. The opposite occurs as the temperature of the bottom of the pan decreases.

Therefore, by providing the plate—for example by silk-screen printing—with a graduated scale or a series of explanatory pictograms, and applying different colored thermo-chromatic paints with different activating temperatures, it will be possible to display, in different areas of the plate, various types of information related to the progress of the temperature of the bottom of the pan.

For a better working of the plate 30,300, the body of the handle 20,200 is provided with holes 28,280 under the housings of the plates.

The invention thus conceived may be subject to numerous modifications and variations, all falling within the scope of the inventive concept. Furthermore, all the details can be replaced with technically equivalent elements.

What is claimed is:

1. A handle for cooking utensils, to be joined to the edge of the utensil, said handle being made with a material having low heat conductivity and comprising:

a) a plate of a material having heat conductivity, said plate having a part of one end in thermal contact with the edge of the utensil and the other end at a distance therefrom; and b) thermo-chromatic means applied in contact with different areas of the plate and having the ability to change color within predetermined ranges of temperature;

the change in the temperature along the plate, caused by the change in the temperature of the bottom of the utensil, will in turn cause the change in color of the thermo-chromatic means and the display of information related to the temperature of the bottom of the utensil on different areas of the plate;

wherein the thermo-chromatic means are crystals or mixture of crystals which have activating temperatures ranging from 20° C. to 100° C., show a specific color outside of the range of activating temperatures, and become transparent within that range, whereby areas of the plate increasingly distant from the body of the utensil reach the temperature at which the thermo-chromatic crystals are activated and become transparent, as the temperature of the bottom of the utensil increases, and vice versa as the temperature of the bottom of the utensil decreases.

2. The handle according to claim 1, wherein the temperature of the plate ranges from 30° C. to 90° C. when the temperature of the bottom of the utensil ranges from 100° C. to 265° C.

3. The handle according to claim 2, wherein the thermo-chromatic crystals are liquid type crystals and are first applied on a film of transparent plastic material that is then fastened to said plate.

4. The handle according to claim 1, wherein the distribution of the heat-sensitive crystals on the plate is arranged so that as the distance from the utensil increases, the temperature at which the crystals are activated also increases.

5. The handle according to claim 1, wherein the distribution of the heat-sensitive crystals on the plate is arranged so that as the distance from the utensil increases, the temperature at which the crystals are activated decreases.

6. The handle according to claim 1, wherein the heat-sensitive crystals are applied directly on said plate in the form of paint, in one or more coats having a decreasing temperature at which they are activated.

7. The handle according to claim 1, wherein the information consists of different colors or graphic or alphanumerical symbols previously reproduced on a film fastened to the plate, or directly on the plate.

8. The handle according to claim 1, wherein the plate is placed in a housing provided on an upper face of the body of the handle with a portion of one end in thermal contact with a side wall of the utensil, and the other end distant therefrom.

9. The handle according to claim 8, wherein said portion of one end of the plate passes through a hole, that places the upper face of the body of the handle in communication with the front face of the body of the handle, and is fastened by a screw that fastens the handle between a metal block and the body of the handle; said metal block being welded to the side wall of the utensil and threaded on the inside.

10. The handle according to claim 1, wherein holes are provided to air said plate.

11. The handle according to claim 3, further comprising a layer of transparent polyurethane resin provided to protect the plate and plastic film.

12. A cooking utensil comprising a handle according claim 1.

13. The handle according to claim 2, wherein the thermo-chromatic crystals are liquid type crystals and are first applied on a film of transparent plastic material that is then fastened to said plate.

14. The handle according to claim 2, wherein the distribution of the heat-sensitive crystals on the plate is arranged so that as the distance from the utensil increases, the temperature at which the crystals are activated also increases.

15. The handle according to claim 3, wherein the distribution of the heat-sensitive crystals on the plate is arranged so that as the distance from the utensil increases, the temperature at with the crystals are activated also increases.

16. The handle according to claim 2, wherein the distribution of the heat-sensitive crystals on the plate is arranged so that as the distance from the utensil increases, the temperature at which the crystals are activated decreases.

* * * * *